(12) United States Patent
Tsukuda et al.

(10) Patent No.: US 6,534,211 B1
(45) Date of Patent: Mar. 18, 2003

(54) FUEL CELL HAVING AN AIR ELECTRODE WITH DECREASED SHRINKAGE AND INCREASED CONDUCTIVITY

(75) Inventors: Hiroshi Tsukuda, Nagasaki (JP); Nagao Hisatome, Nagasaki (JP); Yoshiharu Watanabe, Nagasaki (JP); Tohru Houjyou, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 88 days.

(21) Appl. No.: 09/699,416

(22) Filed: Oct. 31, 2000

(30) Foreign Application Priority Data

Nov. 1, 1999 (JP) .............................. 11-310540
Sep. 28, 2000 (JP) ........................ 2000-295799

(51) Int. Cl.⁷ ............................. H01M 4/88; H01M 4/90
(52) U.S. Cl. .......................... 429/40; 502/101
(58) Field of Search .................. 429/30–32, 40, 429/44, 45; 427/115; 502/101

(56) References Cited

FOREIGN PATENT DOCUMENTS

JP         09-180731 A2  *  7/1997

* cited by examiner

*Primary Examiner*—Patrick Ryan
*Assistant Examiner*—Susy Tsang-Foster
(74) *Attorney, Agent, or Firm*—Birch, Stewart, Kolasch & Birch, LLP

(57) ABSTRACT

A full cell comprising a fuel electrode and an air electrode disposed on side surfaces of an electrolyte film is disclosed. The fuel electrode is supplied with a fuel gas, and the air electrode is supplied with air. The air electrode has a close-packed structure in which the ratio between the average particle size of coarse particles and the average particular size of fine particles is from 5/1 to 250/1. The resulting fuel cell is increased in conductivity.

8 Claims, 3 Drawing Sheets

FUEL CELL HAVING AN AIR ELECTRODE WITH DECREASED SHRINKAGE AND INCREASED CONDUCTIVITY

BACKGROUND OF THE INVENTION

1. Field of the Invention

This invention relates to a fuel cell with increased conductivity.

2. Description of the Related Art

In recent years, various solid oxide fuel cells (SOFC's, hereinafter referred to as "fuel cells") have been proposed as next-generation energy sources.

FIG. 2 shows the outline of the structure of a tubular type fuel cell. As shown in FIG. 2, a tubular type fuel cell 10 is constituted by forming a fuel electrode 12, a solid electrolyte (hereinafter referred to as "an electrolyte")13, and an air electrode 14 as films on a porous cylindrical substrate tube 11 of calcia-stabilized zirconia (CSZ)in this order by the sintering process, and then connecting the fuel electrode 12 and the air electrode 14 together in series by an interconnector 15 as an electrically conductive connecting material. In this tubular type fuel cell, a fuel gas (H2) flows in an axial direction inside the substrate tube 11, while air (oxygen: $O_2$) flows axially along the outside of the substrate tube 11. As the fuel electrode 12, a thermit of Ni and yttria-stabilized zirconia (YSZ), for example, is used. As the air electrode 14, an $LaCaMnO_3$ material, an $LaSrMnO_3$ material, an $LaSrCaMnO_3$ material, an $LaSrMnCoO_3$ material, or an $LaSrMnCrO_3$ material, for example, is used. As the interconnector 15, an $LaCrO_3$ material, an $LaMgCrO_3$ material, or a heat resistant alloy, for example, is used.

FIG. 3 shows the outline of the structure of a planar type fuel cell. As shown in FIG. 3, a planar type fuel cell 20 is prepared by forming a fuel electrode 12 and an air electrode 14 as films on both surfaces of an electrolyte 13 by the sintering process to constitute a cell plate (unit cell) 21, then electrically conductive interconnectors 15 are laid on both surfaces of the cell plate 21 to form a composite, and then binding a plurality of the composites together. In the interconnector 15, a plurality of groove-like fuel channels 22 and a plurality of groove-like air channels 23 for supplying fluids such as a fuel gas (H2)and air (oxygen: $O_2$) are formed so that the fuel gas and air will flow perpendicularly to each other in the directions of the grooves.

The air electrode 14 joined to one side surface of the electrolyte 13 has high reactivity. When the air electrode 14 is integrally sintered at a high temperature of 1,350° C. or higher, it may shrink and develop cracks, or may react with the electrolyte 13. The resulting fuel cell may be unable to perform fully. Under these circumstances, it is difficult to sinter the fuel electrode 12 and the air electrode 14 integrally on both surfaces of the electrolyte 13. Thus, the fuel electrode 12 and the electrolyte 13 are integrally sintered at a high temperature of 1,350° C. or higher as the first sintering step. Then, the electrolyte 13 and the air electrode 14 are sintered at a temperature of 1,350° C. or lower as the second sintering step.

As the properties of the air electrode, the air electrode should increase conductivity, and should be dense in texture, but needs to have some porosity because of the need to diffuse gases. To increase conductivity, a large thickness has been proposed. However, a thick air electrode undergoes cracking or peeling because of its shrinkage percentage. Hence, it is necessary to decrease the shrinkage percentage while maintaining the conductivity, but, prior to the present invention, no satisfactory air electrode has been found.

SUMMARY OF THE INVENTION

In light of the foregoing problems, the present invention aims to provide a fuel cell in which an air electrode minimally shrinks when provided in a film form on a side surface of an electrolyte by the sintering process, and which has high electrical efficiency as well as high conductivity properties.

A first aspect of the invention is a fuel cell comprising a fuel electrode and an air electrode disposed on side surfaces of an electrolyte film, the fuel electrode being supplied with a fuel gas and the air electrode being supplied with air, wherein the air electrode is formed from a material selected from the group consisting of $LaCaMnO_3$ materials, $LaSrMnO_3$ materials, $LaSrCaMnO_3$ materials, $LaSrMnCoO_3$ materials, and $LaSrMnCrO_3$ materials, and a particle size ratio, between the average particle sizes of coarse particles and fine particles of the same material or different materials among the materials for the air electrode, is from 5/1 to 250/1. According to this aspect, an air electrode having a decreased shrinkage during sintering and increased conductivity can be obtained. As a result, a fuel cell having high electrical efficiency as well as high conductivity properties can be obtained.

The average particle size of the coarse particles may be from 5 to 500 $\mu$m, while the average particle size of the fine particles may be from 0.5 to 2 $\mu$m. According to this constitution, an air electrode having a decreased shrinkage during sintering and increased conductivity can be obtained.

The volume ratio between the coarse particles and the fine particles may be from 1/1 to 9/1. According to this constitution, an air electrode having a decreased shrinkage during sintering and increased conductivity can be obtained.

The shrinkage of the air electrode during sintering may be from 0.1 to 5% linearly. According to this constitution, no more cracking or peeling of the air electrode occurs.

The conductivity of the air electrode after sintering may be 50 S/cm or more. This air electrode is preferred for use in a fuel cell.

The porosity of the air electrode after sintering may be from 30 to 50%. Thus, a fuel cell with satisfactory permeability without a decrease in conductivity can be obtained.

The fuel cell may be a tubular type fuel cell or a planar type fuel cell. This fuel cell has high electrical efficiency as well as high conductivity properties.

A second aspect of the invention is a material for an air electrode sintered onto a side surface of an electrolyte in a planar type or tubular type fuel cell, wherein the material is selected from the group consisting of $LaCaMnO_3$ materials, $LaSrMnO_3$ materials, $LaSrCaMnO_3$ materials, $LaSrMnCoO_3$ materials, and $LaSrMnCrO_3$ materials, and the material comprises a combination of coarse particles having an average particle size of from 5 to 500 $\mu$m and fine particles having an average particle size of from 0.5 to 2 $\mu$m, the coarse particles and the fine particles comprising the same material or different materials among the materials for the air electrode, and the volume ratio between the coarse particles and the fine particles being from 1/1 to 9/1. According to this aspect, an air electrode having a decreased shrinkage during sintering and increased conductivity can be obtained.

A third aspect of the invention is a method for producing a planar type or tubular type fuel cell having an air electrode sintered onto a side surface of an electrolyte in the planar type or tubular type fuel cell, comprising a first sintering step of sintering a fuel electrode integrally on a side surface of the electrolyte at a temperature of from 1,300 to 1,500° C., and a second sintering step of sintering the air electrode integrally on the other side surface of the electrolyte at a temperature of from 1,200 to 1,350° C., the air electrode comprising the material of the second aspect of the invention, and wherein thermal shrinkage of the air electrode is suppressed during the second sintering step. According to this constitution, an air electrode having markedly decreased shrinkage during sintering and increased conductivity can be obtained. Furthermore, no more cracking or peeling of the air electrode occurs. Consequently, the electrical efficiency of the fuel cell can be maintained stably for a long period.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED-EMBODIMENTS

Preferred embodiments of the present invention will now be described, but it should be understood that the invention is not restricted thereby.

The fuel cell of the present invention comprises a fuel electrode and an air electrode disposed on side surfaces of an electrolyte film, in which the fuel electrode is supplied with a fuel gas, and the air electrode is supplied with air. The air electrode has a close-packed structure in which the ratio between the average particle size of coarse particles and the average particle size of fine particles is from 5/1 to 250/1.

Figure 1:
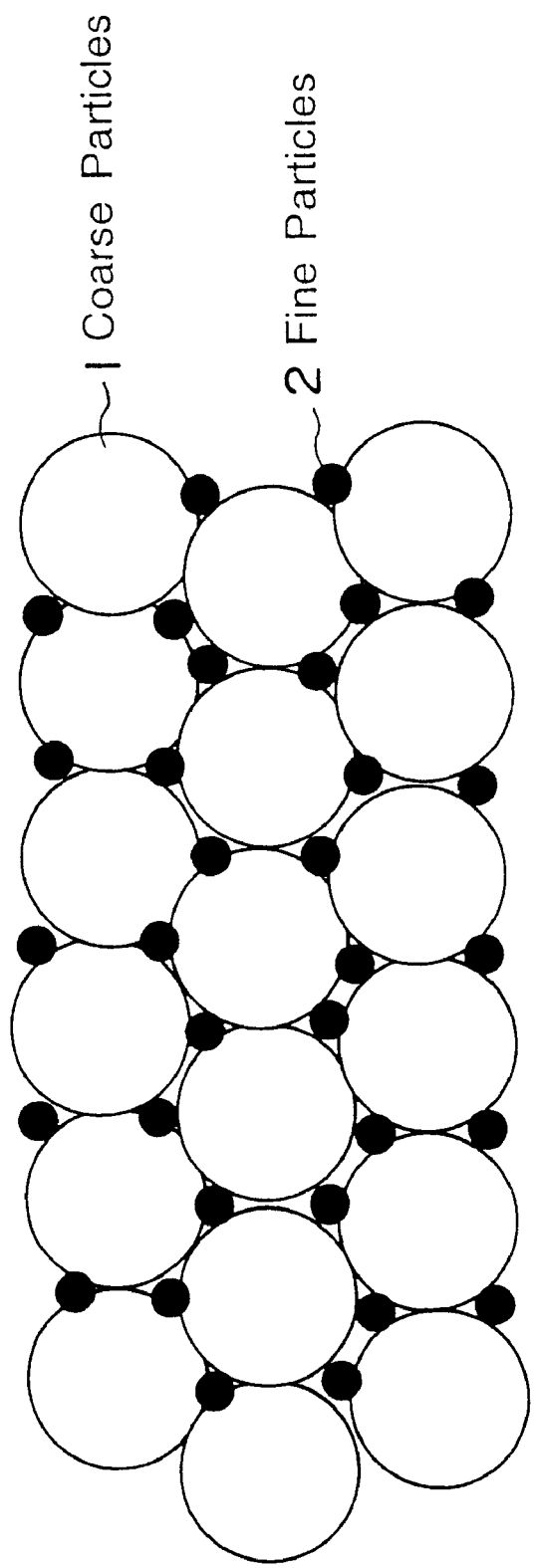
FIG. 1 is a model view of a close-packed structure of a material for an air electrode.

FIG. 1 is a model view of the close-packed structure of the material for the air electrode. As shown in FIG. 1, the air electrode of the present invention has the close-packed structure in which the average particle size of coarse particles 1 is from 5 to 500 $\mu$m, while the average particle size of fine particles 2 is from 1 to 2 $\mu$m, with the average particle size ratio between the coarse particles 1 and the fine particles 2 being set at from 5/1 to 250/1 as stated above. If the average particle size of the coarse particles is less than 5 $\mu$m, the shrinkage during sintering will exceed 5%, producing unfavorable results. If the average particle size of the coarse particles 1 is more than 500 $\mu$m, the shrinkage during sintering will be 0%. In this case, the air electrode film will be brittle, and low in conductivity.

The volume ratio of the coarse particles and the fine particles is desirably from 1/1 to 9/1, as will be indicated in the Examples to be offered later on. If the coarse particle/fine particle volume ratio is 1/1, the shrinkage during sintering will exceed 5%, producing unfavorable results. If the volume ratio is 10/1, the shrinkage during sintering will be 0%. In this case, the air electrode film will be brittle, and low in conductivity.

By setting the particle sizes in two modes and providing the close-packed structure, the conductivity of the air electrode after sintering will be 50 S/cm or more, as shown in the Examples given later.

The porosity of the air electrode after sintering is set at from 30 to 50%. To guide air from the air electrode to the electrolyte, high porosity is desirable. At a porosity in excess of 50%, however, the conductivity will be lowered. This is not preferred.

The material for the air electrode may be a publicly known material for an air electrode in a fuel cell, and is not restricted in the invention. A particularly preferred example is a material selected from among $LaCaMnO_3$ materials, $LaSrMnO_3$ materials, $LaSrCaMnO_3$ materials, $LaSrMnCoO_3$ materials, and $LaSrMnCrO_3$ materials, as will be seen in the Examples.

Figure 2:
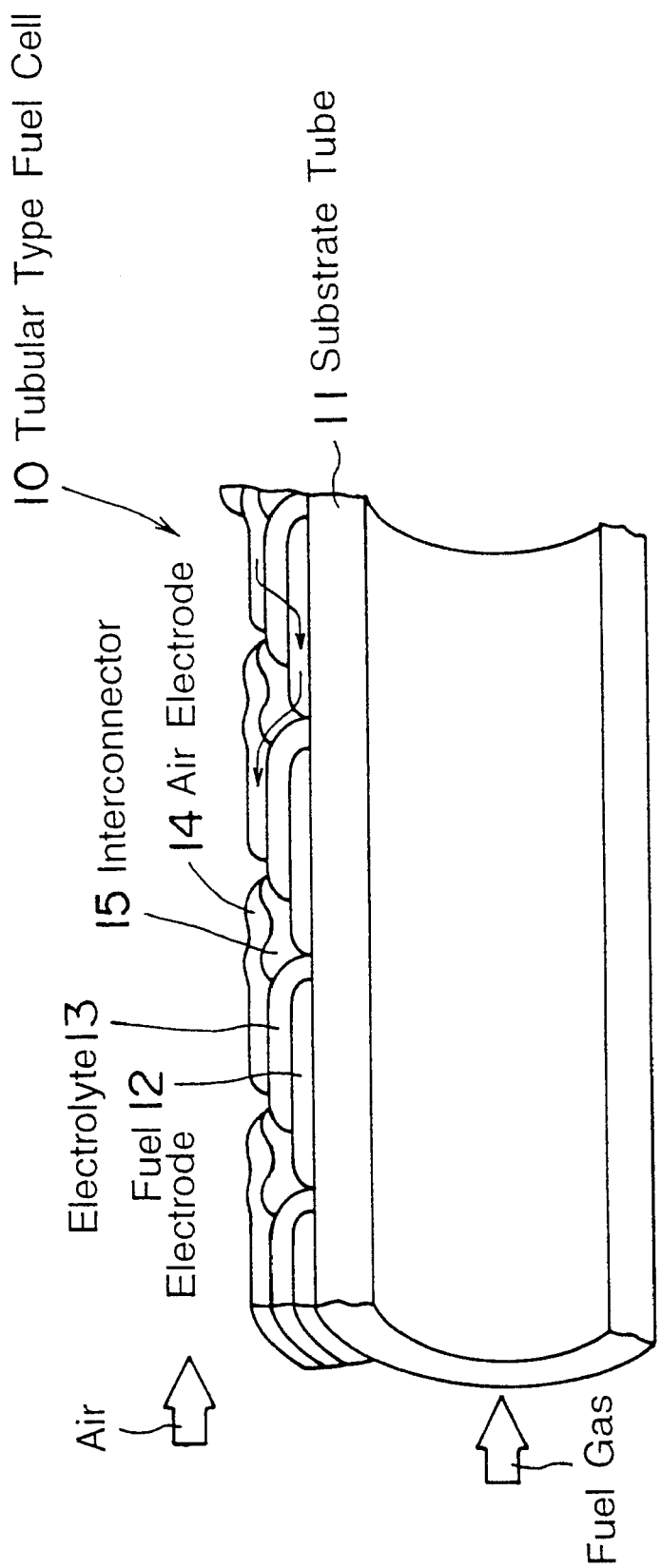
FIG. 2 is a schematic constitution drawing of a tubular type fuel cell.
Figure 3:
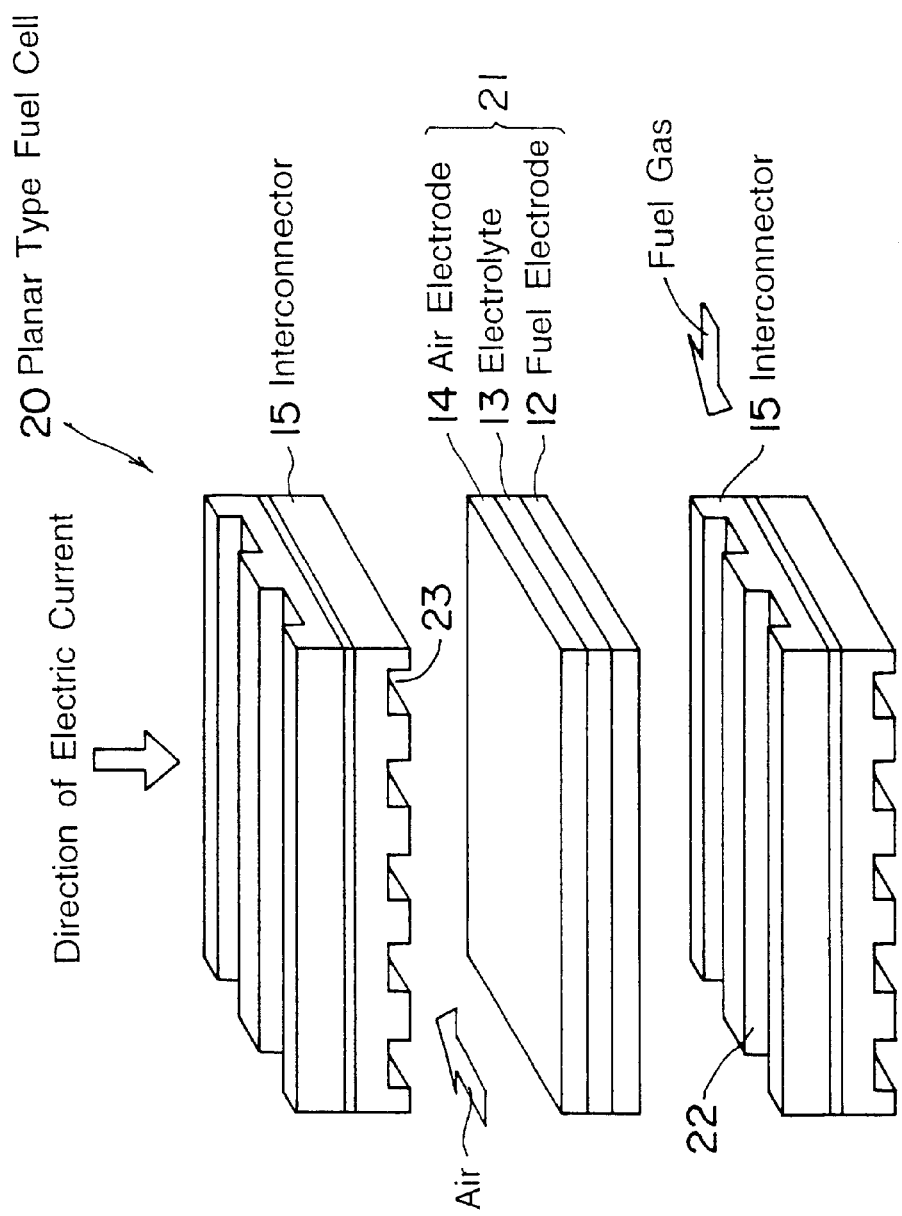
FIG. 3 is a schematic constitution drawing of a planar type fuel cell.

The fuel cell of the invention is not restricted to a particular type, and may be a tubular type fuel cell as shown in FIG. 2 or a planar type fuel cell as shown in FIG. 3. The tubular type fuel cell is different from the planar type fuel cell in that it requires a substrate tube. However, it is equivalent to the planar type fuel cell in that the air electrode is produced in a film form on the side surface of the electrolyte by the sintering process.

A method for producing a fuel cell according to the present invention comprises a first sintering step of sintering a fuel electrode integrally on a side surface of an electrolyte at a temperature of from 1,300 to 1,500° C., and a second sintering step of sintering an air electrode integrally on the other side surface of the electrolyte at a temperature of from 1,200 to 1,350° C., the air electrode comprising the aforementioned material composed of bimodal particles, i.e., coarse particles and fine particles, and having a close-packed structure. During the second sintering step, the material for an air electrode according to the present invention is used to suppress thermal shrinkage of the air electrode during the second sintering step. As noted above, the sintering temperature for the electrolyte and the fuel electrode is set at from 1,300 to 1,500° C. This is because, if the sintering temperature is lower than 1,300° C., densification of the electrolyte will be insufficient. If the sintering temperature is higher than 1,500° C., the densification of the fuel electrode will be accelerated.

The thickness of the resulting film is not restricted compared with conventional thermal spraying, but it may be about 2 mm, for example, and about 1 mm, preferably. To increase conductivity, a large thickness is necessary. However, a thickness in excess of 2 mm does not result in a marked increase in conductivity, but leads to a waste of the material and poor air permeability.

With the tubular type fuel cell, as shown in FIG. 2, green sheets for a fuel electrode 12, an electrolyte 13, and an interconnector 15 are simultaneously wound on the surface of a substrate tube 11 during the first sintering step, and then sintered. In this first sintering step, thermal shrinkage takes place. Then, during the second sintering step, a green sheet for an air electrode 14 is wound on the resulting films, and then sintered. At the time of this sintering, thermal shrinkage is very low as stated earlier. According to these sintering steps, a plurality of unit cells are arranged in series in a horizontally striped pattern on a single substrate tube 11, and electrically connected together by interconnectors 15 to constitute a horizontally striped tubular type fuel cell. The resulting single fuel cell itself constitutes a small stack, and these stacks are gathered to constitute a fuel cell module.

EXAMPLES

The present invention will be described in more detail with reference to Examples as contrasted with Comparative Examples, but the invention is in no way limited thereby.

Examples 1 to 13 and Comparative Examples 1 to 5

Table 1 shows materials for the air electrode of the tubular type fuel cell illustrated in FIG. 2.

On the surface of the substrate tube 11, there were laminated a 100 μm thick fuel electrpde 12 comprising an Ni-zirconia thermit, a 100 μm thick electrolyte 13 comprising YSZ, and a conductive connecting material $LaCrO_3$ for connecting the fuel electrode with an air electrode. The composite was subjected to a first sintering.

Then, various material for an air electrode, which are shown in Table 1, were each laminated onto the previously sintered tubular structure, followed by performing a second sintering step to form an air electrode 14 as a film, thereby constituting a fuel cell. The fuel cell was measured for the shrinkage of the air electrode 14 during sintering (for 2 hours at 1,300° C.). The conductivity of the air electrode 14 was also measured. The results are presented in Table 1.

TABLE 1

| | Material | Particle size (μm) Coarse | Particle size (μm) Fine | Particle size ratio | Volume (vol %) Coarse | Volume (vol %) Fine | Volume ratio | Shrinkage during sintering* (%) | Conductivity S/cm |
|---|---|---|---|---|---|---|---|---|---|
| Ex. 1 | $La_{0.6}Ca_{0.4}MnO_3$ | 5 | 1 | 5/1 | 70 | 30 | 7/3 | 1.9 | 82 |
| Ex. 2 | $La_{0.6}Ca_{0.4}MnO_3$ | 20 | 2 | 10/1 | 70 | 30 | 7/3 | 1.0 | 91 |
| Ex. 3 | $La_{0.6}Ca_{0.4}MnO_3$ | 100 | 2 | 50/1 | 70 | 30 | 7/3 | 0.8 | 75 |
| Ex. 4 | $La_{0.6}Ca_{0.4}MnO_3$ | 500 | 2 | 250/1 | 70 | 30 | 7/3 | 0.6 | 83 |
| Ex. 5 | $La_{0.6}Ca_{0.4}MnO_3$ | 20 | 2 | 10/1 | 90 | 10 | 9/1 | 0.5 | 77 |
| Ex. 6 | $La_{0.6}Ca_{0.4}MnO_3$ | 20 | 2 | 10/1 | 50 | 50 | 1/1 | 1.2 | 78 |
| Ex. 7 | $La_{0.6}Ca_{0.4}MnO_3$ | 20 | 2 | 10/1 | 70 | 30 | 7/3 | 1.1 | 80 |
| Ex. 8 | $La_{0.9}Ca_{0.1}MnO_3$ | 20 | 2 | 10/1 | 70 | 30 | 7/3 | 1.4 | 90 |
| Ex. 9 | $La_{0.5}Ca_{0.25}Sr_{0.25}MnO_3$ | 20 | 2 | 10/1 | 70 | 30 | 7/3 | 1.5 | 110 |
| Ex. 10 | $La_{0.8}Ca_{0.2}MnO_3$ | 20 | 2 | 10/1 | 70 | 30 | 7/3 | 1.8 | 71 |
| Ex. 11 | $La_{0.9}Sr_{0.1}Mn_{0.95}Co_{0.05}O_3$ | 20 | 2 | 10/1 | 70 | 30 | 7/3 | 1.3 | 70 |
| Ex. 12 | $La_{0.9}Sr_{0.1}Mn_{0.95}Cr_{0.05}O_3$ | 20 | 2 | 10/1 | 70 | 30 | 7/3 | 1.2 | 73 |
| Ex. 13 | $La_{0.6}Ca_{0.4}MnO_3$ | 20 | 2 | 10/1 | 70 | 30 | 7/3 | 1.6 | 65 |
| Ex. 14 | $La_{0.6}Ca_{0.4}MnO_3$ (coarse)/ $La_{0.9}Ca_{0.1}MnO_3$ (fine) | 20 | 2 | 10/1 | 70 | 30 | 7/3 | 1.0 | 92 |
| Ex. 15 | $La_{0.6}Ca_{0.4}MnO_3$ (coarse)/ $La_{0.5}Ca_{0.25}Sr_{0.25}MnO_3$ (fine) | 20 | 2 | 10/1 | 70 | 30 | 7/3 | 1.1 | 88 |
| Ex. 16 | $La_{0.6}Ca_{0.4}MnO_3$ (coarse)/ $La_{0.9}Sr_{0.1}MnO_3$ (fine) | 20 | 2 | 10/1 | 70 | 30 | 7/3 | 1.4 | 84 |
| Ex. 17 | $La_{0.6}Ca_{0.4}MnO_3$ (coarse)/ $La_{0.8}Sr_{0.2}MnO_3$ (fine) | 20 | 2 | 10/1 | 70 | 30 | 7/3 | 1.5 | 82 |
| Ex. 18 | $La_{0.6}Ca_{0.4}MnO_3$ (coarse)/ $La_{0.9}Sr_{0.1}Mn_{0.95}Co_{0.05}O_3$ (fine) | 20 | 2 | 10/1 | 70 | 30 | 7/3 | 1.8 | 89 |
| Ex. 19 | $La_{0.6}Ca_{0.4}MnO_3$ (coarse)/ $La_{0.9}Sr_{0.1}Mn_{0.95}Cr_{0.05}O_3$ (fine) | 20 | 2 | 10/1 | 70 | 30 | 7/3 | 1.3 | 78 |
| Ex. 20 | $La_{0.5}Ca_{0.25}Sr_{0.25}MnO_3$ (coarse)/ $La_{0.6}Ca_{0.4}MnO_3$ (fine) | 20 | 2 | 10/1 | 70 | 30 | 7/3 | 1.2 | 75 |
| Ex. 21 | $La_{0.8}Sr_{0.1}Mn_{0.95}Co_{0.05}O_3$ (coarse)/ $La_{0.9}Ca_{0.4}MnO_3$ (fine) | 20 | 2 | 10/1 | 70 | 30 | 7/3 | 1.6 | 69 |
| C. Ex. 1 | $La_{0.6}Ca_{0.4}MnO_3$ | 3 | 1 | 3/1 | 70 | 30 | 7/3 | 5.3 | 35 |
| C. Ex. 2 | $La_{0.6}Ca_{0.4}MnO_3$ | 700 | 2 | 350/1 | 70 | 30 | 7/3 | 0.1 | 30 |
| C. Ex. 3 | $La_{0.6}Ca_{0.4}MnO_3$ | 20 | 5 | 4/1 | 70 | 30 | 7/3 | 0.2 | 33 |
| C. Ex. 4 | $La_{0.6}Ca_{0.4}MnO_3$ | 20 | 2 | 10/1 | 91 | 9 | 10/1 | 0.2 | 35 |
| C. Ex. 5 | $La_{0.6}Ca_{0.4}MnO_3$ | 20 | 2 | 10/1 | 33 | 67 | 1/2 | 6.3 | 28 |
| C. Ex. 6 | $La_{0.6}Ca_{0.4}MnO_3$ | 20 | 2 | 10/1 | 20 | 80 | 1/4 | 13.2 | 12 |

| | Material | Porosity | Cracking during sintering | Conductivity deterioration during heat cycle (%) | Cracking during heat cycle | Type |
|---|---|---|---|---|---|---|
| Ex. 1 | $La_{0.6}Ca_{0.4}MnO_3$ | 36 | No | 0.2 | No | Tubular |
| Ex. 2 | $La_{0.6}Ca_{0.4}MnO_3$ | 38 | No | 0.2 | No | Tubular |
| Ex. 3 | $La_{0.6}Ca_{0.4}MnO_3$ | 40 | No | 0.1 | No | Tubular |
| Ex. 4 | $La_{0.6}Ca_{0.4}MnO_3$ | 43 | No | 0.2 | No | Tubular |
| Ex. 5 | $La_{0.6}Ca_{0.4}MnO_3$ | 38 | No | 0.1 | No | Tubular |
| Ex. 6 | $La_{0.6}Ca_{0.4}MnO_3$ | 36 | No | 0.1 | No | Tubular |
| Ex. 7 | $La_{0.6}Ca_{0.4}MnO_3$ | 42 | No | 0.1 | No | Planar |
| Ex. 8 | $La_{0.9}Ca_{0.1}MnO_3$ | 37 | No | 0.2 | NO | Tubular |
| Ex. 9 | $La_{0.5}Ca_{0.25}Sr_{0.25}MnO_3$ | 38 | No | 0.2 | No | Tubular |
| Ex. 10 | $La_{0.8}Ca_{0.2}MnO_3$ | 39 | No | 0.1 | No | Tubular |
| Ex. 11 | $La_{0.9}Sr_{0.1}Mn_{0.95}Co_{0.05}O_3$ | 40 | No | 0.3 | No | Tubular |
| Ex. 12 | $La_{0.9}Sr_{0.1}Mn_{0.95}Cr_{0.05}O_3$ | 38 | No | 0.2 | No | Tubular |
| Ex. 13 | $La_{0.6}Ca_{0.4}MnO_3$ | 43 | No | 0.1 | NO | Tubular |
| Ex. 14 | $La_{0.6}Ca_{0.4}MnO_3$ (coarse)/ $La_{0.9}Ca_{0.1}MnO_3$ (fine) | 38 | No | 0.2 | No | Tubular |
| Ex. 15 | $La_{0.6}Ca_{0.4}MnO_3$ (coarse)/ | 42 | No | 0.1 | NO | Tubular |

TABLE 1-continued

| | | | | | | |
|---|---|---|---|---|---|---|
| | $La_{0.5}Ca_{0.25}Sr_{0.25}MnO_3$ (fine) | | | | | |
| Ex. 16 | $La_{0.6}Ca_{0.4}MnO_3$ (coarse)/ $La_{0.9}Sr_{0.1}MnO_3$ (fine) | 38 | No | 0.2 | No | Tubular |
| Ex. 17 | $La_{0.6}Ca_{0.4}MnO_3$ (coarse)/ $La_{0.8}Sr_{0.2}MnO_3$ (fine) | 37 | No | 0.2 | No | Tubular |
| Ex. 18 | $La_{0.6}Ca_{0.4}MnO_3$ (coarse)/ $La_{0.9}Sr_{0.1}Mn_{0.95}Co_{0.05}O_3$ (fine) | 38 | No | 0.1 | No | Tubular |
| Ex. 19 | $La_{0.6}Ca_{0.4}MnO_3$ (coarse)/ $La_{0.9}Sr_{0.1}Mn_{0.95}Cr_{0.05}O_3$ (fine) | 40 | No | 0.3 | No | Tubular |
| Ex. 20 | $La_{0.5}Ca_{0.25}Sr_{0.25}MnO_3$ (coarse)/ $La_{0.6}Ca_{0.4}MnO_3$ (fine) | 38 | No | 0.2 | No | Tubular |
| Ex. 21 | $La_{0.5}Sr_{0.1}Mn_{0.95}Co_{0.05}O_3$ (coarse)/ $La_{0.9}Ca_{0.4}MnO_3$ (fine) | 43 | No | 0.1 | No | Planar |
| C. Ex. 1 | $La_{0.6}Ca_{0.4}MnO_3$ | 51 | No | 0.1 | No | Tubular |
| C. Ex. 2 | $La_{0.6}Ca_{0.4}MnO_3$ | 54 | No | 0.1 | No | Tubular |
| C. Ex. 3 | $La_{0.6}Ca_{0.4}MnO_3$ | 52 | No | 0.2 | No | Tubular |
| C. Ex. 4 | $La_{0.6}Ca_{0.4}MnO_3$ | 50 | No | 0.1 | No | Tubular |
| C. Ex. 5 | $La_{0.6}Ca_{0.4}MnO_3$ | 24 | Yes | 5 | Yes*1 | Tubular |
| C. Ex. 6 | $La_{0.6}Ca_{0.4}MnO_3$ | 15 | Yes | 15 | Yes*2 | Tubular |

*When held at 1,300° C. for 2 hours
*1: Cracking progressed.
*2: Cracking progressed, and peeling occurred.

As shown in Table 1, the fuel cells of the Examples according to the present invention all had low shrinkage during sintering of from 0.1 to 5%, a conductivity higher than 50 S/cm, and a porosity of from 36 to 50, in comparison with the fuel cells of the Comparative Examples.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. A material for an air electrode sintered onto a side surface of an electrolyte in a planar type or tubular type fuel cell, wherein:
   the material is selected from the group consisting of $LaCaMnO_3$ materials, $LaSrMnO_3$ materials, $LaSrCaMnO_3$ materials, $LaSrMnCoO_3$ materials, and $LaSrMnCrO_3$ materials; and
   the material comprises a combination of coarse particles having an average particle size of from S to 500 μm, and fine particles having and average particle size of from 0.5 to 2 μm, the coarse particles and the fine particles comprising the same material or different materials among the materials for the air electrode, and a volume ratio between the coarse particles and the fine particles being from 1/1 to 9/1.

2. A method for producing a planar type of tubular type fuel cell having an air electrode sintered onto a side surface of an electrolyte in the planar type or tubular type fuel cell, comprising:
   a first sintering step of sintering a fuel electrode integrally on a side surface of the electrolyte at a temperature of from 1,300 to 1,500° C.; and
   a second sintering step of sintering the air electrode integrally on the other side surface of the electrolyte at a temperature of from 1,200 to 1,350° C., the air electrode comprising the material of claim 1, and wherein:
   thermal shrinkage of the air electrode is suppressed during the second sintering step.

3. A fuel cell comprising a fuel electrode and an air electrode being disposed by sintering on side surfaces of an electrolyte film, the fuel electrode being supplied with a fuel gas and the air electrode being supplied with air, wherein:
   the air electrode is formed from a material selected from the group consisting of $LaCaMnO_3$ materials, $LaSrMnO_3$ materials, $LaSrCaMnO_3$ materials, $LaSrMnCoO_3$ materials, and $LaSrMnCrO_3$ materials; and
   a particle size ratio, between average particle sizes of coarse particles and fine particles of the same material or different materials among the material for the air electrode, is from 5/1 to 250/1; and
   wherein the conductivity of the air electrode after sintering is 50 S/cm or more.

4. A fuel cell comprising a fuel electrode and an air electrode being disposed by sintering on side surfaces of an electrolyte film, the fuel electrode being supplied with a fuel gas and the air electrode being supplied with air, wherein:
   the air electrode is formed from a material selected from the group consisting of $LaCaMnO_3$ materials, $LaSrMnO_3$ materials, $LaSrCaMnO_3$ materials, $LaSrMnCoO_3$ materials, and $LaSrMnCrO_3$ materials; and
   a particle size ratio, between average particle sizes of coarse particles and fine particles of the same material or different materials among the material for the air electrode, is from 5/1 to 250/1; and
   wherein the shrinkage of the air electrode during sintering is from 0.1 to 5% linearly.

5. A fuel cell comprising a fuel electrode and an air electrode disposed on side surfaces of an electrolyte film, the fuel electrode being supplied with a fuel gas and the air electrode being supplied with air, wherein:
   the air electrode is formed from a material selected from the group consisting of $LaCaMnO_3$ materials, $LaSrMnO_3$ materials, $LaSrCaMnO_3$ materials, $LaSrMnCoO_3$ materials, and $LaSrMnCrO_3$ materials; and
   a particle size ratio, between average particle sizes of coarse particles and fine particles of the same material or different materials among the material for the air electrode, is from 5/1 to 250/1; and a volume ratio between the coarse particles and the fine particles is in the range from 1/1 to 9/1.

6. The fuel cell of claim 5, wherein: porosity of the air electrode after sintering is 30 to 50%.

7. The fuel cell of claim 5, which is a tubular type fuel cell or a planar type fuel cell.

8. The fuel cell of claim 5, wherein:
the average particle size of the coarse particles is 5 to 500 pm, while the average particle size of fine particles is 0.5 to 2 $\mu$m.

* * * * *